(12) United States Patent
Kim et al.

(10) Patent No.: US 11,704,050 B2
(45) Date of Patent: Jul. 18, 2023

(54) MEMORY SYSTEM FOR DETERMINING A MEMORY AREA IN WHICH A JOURNAL IS STORED ACCORDING TO A NUMBER OF FREE MEMORY BLOCKS

(71) Applicant: SK hynix Inc., Gyeonggi-do (KR)

(72) Inventors: Jin Pyo Kim, Gyeonggi-do (KR); Woo Young Yang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 107 days.

(21) Appl. No.: 17/342,007

(22) Filed: Jun. 8, 2021

(65) Prior Publication Data
US 2022/0206706 A1 Jun. 30, 2022

(30) Foreign Application Priority Data
Dec. 31, 2020 (KR) .......................... 10-2020-0188665

(51) Int. Cl.
*G06F 3/06* (2006.01)
*G06F 12/02* (2006.01)

(52) U.S. Cl.
CPC ........... *G06F 3/0655* (2013.01); *G06F 3/0604* (2013.01); *G06F 3/0679* (2013.01); *G06F 12/02* (2013.01)

(58) Field of Classification Search
CPC ..................... G06F 2212/1032; G06F 12/0292
See application file for complete search history.

(56) References Cited

U.S. PATENT DOCUMENTS
2020/0218619 A1* 7/2020 Hwang ............... G06F 16/1815

FOREIGN PATENT DOCUMENTS
KR  10-1965549 B1  4/2019
KR  10-2020-0086143 A  7/2020

\* cited by examiner

*Primary Examiner* — David Yi
*Assistant Examiner* — Nicholas A. Paperno
(74) *Attorney, Agent, or Firm* — IP & T Group LLP

(57) ABSTRACT

A memory system which stores a journal including mapping change information, either in a first memory area or a second memory area, depending on available space of a memory device included in the memory system, being greater than a threshold.

15 Claims, 14 Drawing Sheets

MEMORY SYSTEM FOR DETERMINING A MEMORY AREA IN WHICH A JOURNAL IS STORED ACCORDING TO A NUMBER OF FREE MEMORY BLOCKS

CROSS-REFERENCE TO RELATED APPLICATION

The present application claims priority under 35 U.S.C. 119(a) to Korean patent application number 10-2020-0188665 filed on Dec. 31, 2020, which is incorporated herein by reference in its entirety.

BACKGROUND

1. Technical Field

The embodiments of the present disclosure relate to a memory system and an operating method thereof.

2. Related Art

A memory system includes a data storage device that stores data on the basis of a request from a host, such as a computer, servers, a smartphone, a tablet PC, or other electronic devices. The examples of the memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling the memory device. The memory controller may receive a command from the host and, on the basis of the received command, may execute the command or control read/write/erase operations on the memory devices in the memory system. The memory controller may be used to execute firmware operations for performing a logical operation for controlling such operations.

The memory system may store journals generated in the process of reading, writing, or erasing data in the memory device in the memory device.

SUMMARY

Embodiments of the present disclosure may provide a memory system and an operating method thereof capable of preventing the reduction of the number of free memory blocks when power-off occurs frequently.

Furthermore, embodiments of the present disclosure may provide a memory system and an operating method thereof capable of executing faster an operation for securing the free memory block.

In one aspect, embodiments of the present disclosure may provide a memory system including a memory device including a plurality of memory blocks, and a memory controller for communicating with the memory device and controlling the memory device.

The memory controller may store, in a first memory area or a second memory area each including at least one of the plurality of memory blocks, a journal including mapping change information between a logical address and a physical address according to a number of free memory blocks among the plurality of memory blocks.

The memory controller may store the journal by including the journal in a meta-slice constituting meta-data when storing the journal in the first memory area, and independently stores the journal when storing the journal in the second memory area.

The memory controller may store the journal in the first memory area when the number of free memory blocks among the plurality of memory blocks exceeds a threshold, and stores the journal in the second memory area when the number of free memory blocks among the plurality of memory blocks is less than or equal to the threshold.

In response to when the number of free memory blocks among the plurality of memory blocks decreases from a value exceeding the threshold to a value equal to or less than the threshold, the memory controller may store a start flag, which indicates that the operation of storing the journal in the second memory area is started, in the memory device. In this case, the memory controller may store the start flag in the first memory area.

The memory controller may store, in response to the number of free memory blocks among the plurality of memory blocks increasing from the value equal to or less than the threshold to the value exceeding the threshold after the storing of the start flag in the memory device, an end flag, which indicates an end of the operation of storing the journal in the second memory area in the memory device. In this case, the memory controller may store the end flag in the first memory area.

In a case that the start flag and the end flag are detected as stored in the memory device during a power-on operation after a power-off occurs, the memory controller may update a mapping table indicating a mapping relationship between the logical address and the physical address based on the journal stored in the second memory area.

In another aspect, embodiments of the present disclosure may provide an operating method of a memory system including a memory device having a plurality of memory blocks.

The operating method of the memory system may include checking a number of free memory blocks among the plurality of memory blocks.

The operating method of the memory system may include storing a journal including mapping change information between a logical address and a physical address in a first memory area or a second memory area each including at least one of the plurality of memory blocks according to the number of free memory blocks among the plurality of memory blocks.

The storing may include storing the journal by including the journal in a meta-slice constituting meta-data when storing the journal in the first memory area, and storing independently the journal when storing the journal in the second memory area.

The storing may include storing the journal in the first memory area when the number of free memory blocks among the plurality of memory blocks exceeds a threshold, and storing the journal in the second memory area when the number of free memory blocks among the plurality of memory blocks is less than or equal to the threshold.

The storing of the journal in the first memory area or the second memory area may include, in response to the number of free memory blocks among the plurality of memory blocks decreasing from a value exceeding the threshold to a value equal to or less than the threshold, a start flag, which indicates that the operation of storing the journal in the second memory area is started, in the memory device.

The storing of the journal in the first memory area or the second memory area may include storing, in response to the number of free memory blocks among the plurality of memory blocks increasing from the value equal to or less than the threshold to the value exceeding the threshold after storing the start flag in the memory device, an end flag, which indicates an end of the operation of storing the journal in the second memory area in the memory device.

The operating method of the memory system may further include updating, in a case when the start flag and the end flag are detected as stored in the memory device during a power-on operation after a power-off occurs, a mapping table indicating a mapping relationship between the logical address and the physical address based on the journal stored in the second memory area.

In another aspect, embodiments of the present disclosure may provide a memory system which includes a memory device including at least first and second memory regions and a controller.

The controller may generate a journal representing a change history of a relationship between logical and physical addresses.

The controller may control the memory device to store, into the first memory region, the journal together with meta-information when an available space of the memory device is greater than a threshold.

The controller may control the memory device to store, into the second memory region, the journal without the meta-information and to store, into the first memory region, an indication while the available space is less than the threshold.

The controller may rebuild, when detecting the indication right after a power interruption, meta-data stored in the memory device by replaying the journal stored in the second memory region.

The indication may include at least one of first and second indication. The first indication may represent a start of storing the journal into the second memory region and the second indication represents an end of the storing. The controller may rebuild the meta-data when detecting both the first and second indication.

According to the embodiments of the present disclosure, it is possible to prevent the reduction of the number of free memory blocks when power-off occurs frequently, and execute faster an operation for securing the free memory block.

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
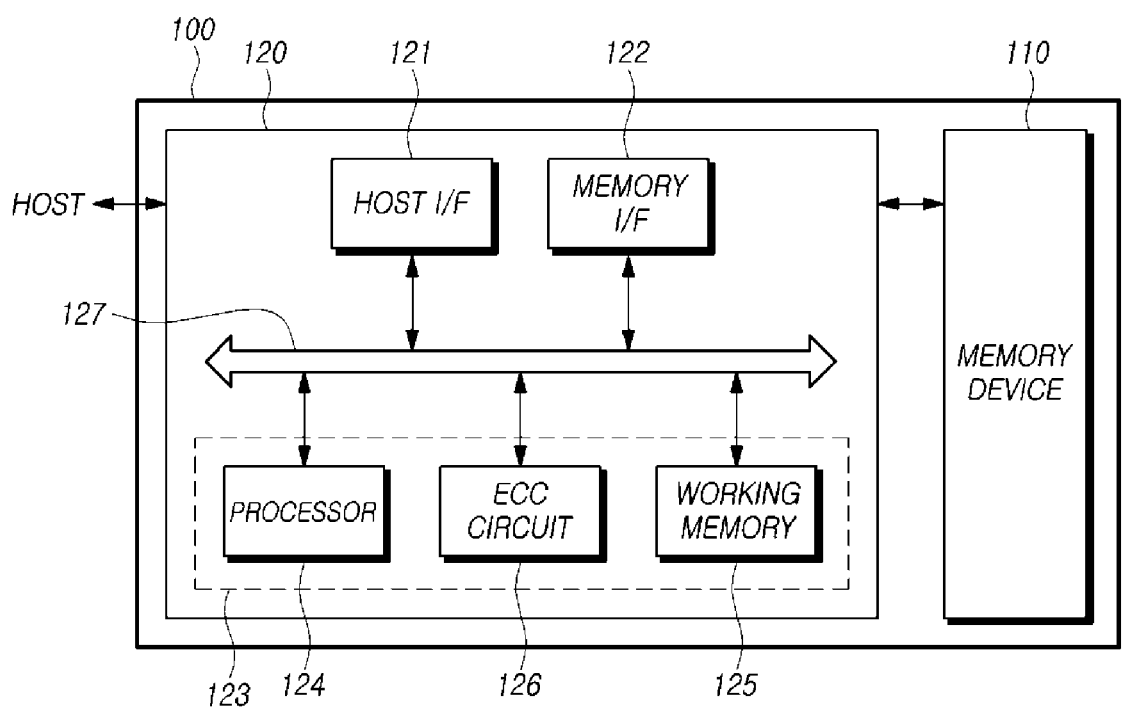
FIG. 1 is a schematic diagram illustrating a configuration of a memory system based on an embodiment of the disclosed technology.

FIG. 1 is a diagram illustrating the schematic configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 may store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection operation (GC), a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. That is, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In the present disclosure, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 (that is, the host interface 121, the memory interface 122, the processor 124, the working memory 125 and the error detection/correction circuit 126) of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of the constituent elements illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
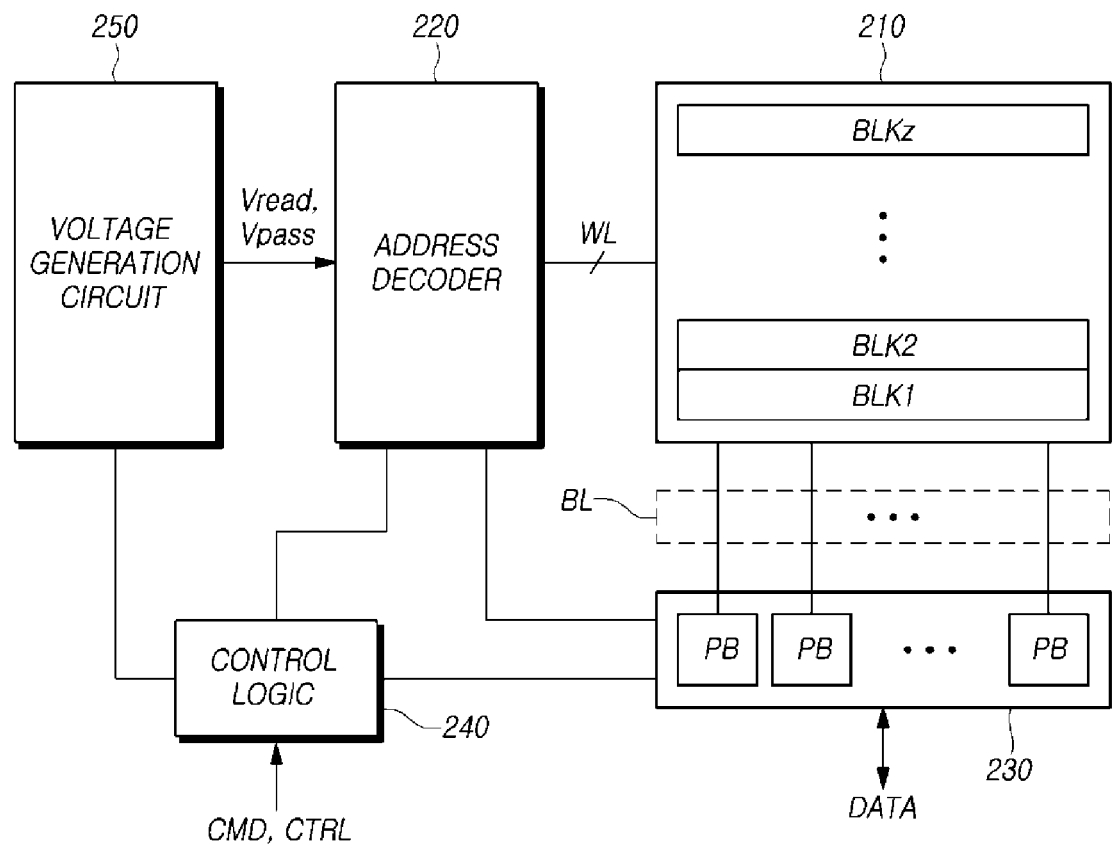
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or greater than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
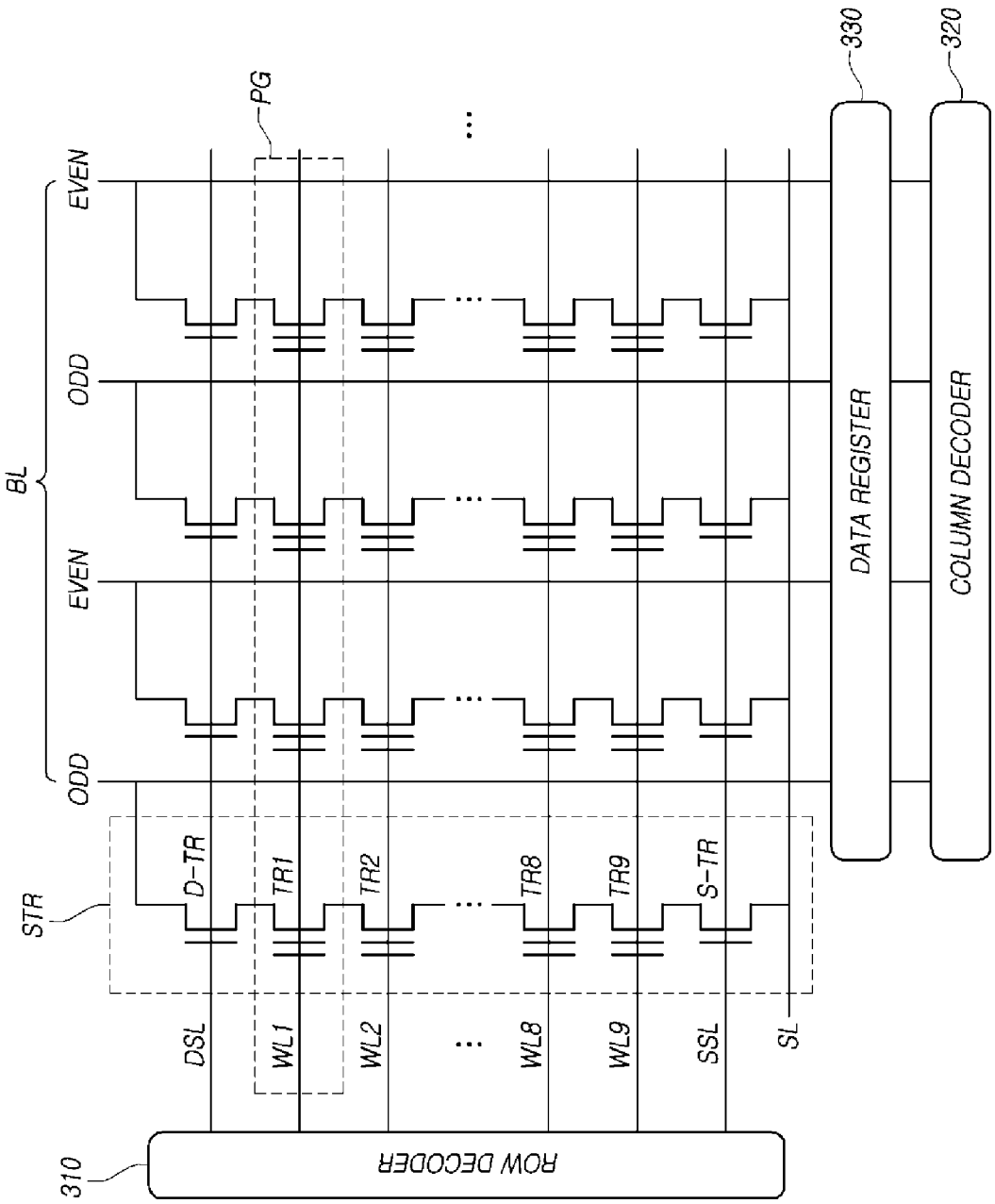
FIG. 3 is a diagram illustrating a structure of word lines and bit lines of a memory device based on an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are arranged, and an auxiliary area (the remaining area other than the core area) to include circuitry that may perform the operations of the memory cell array 210.

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of an odd-numbered bit line and an even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
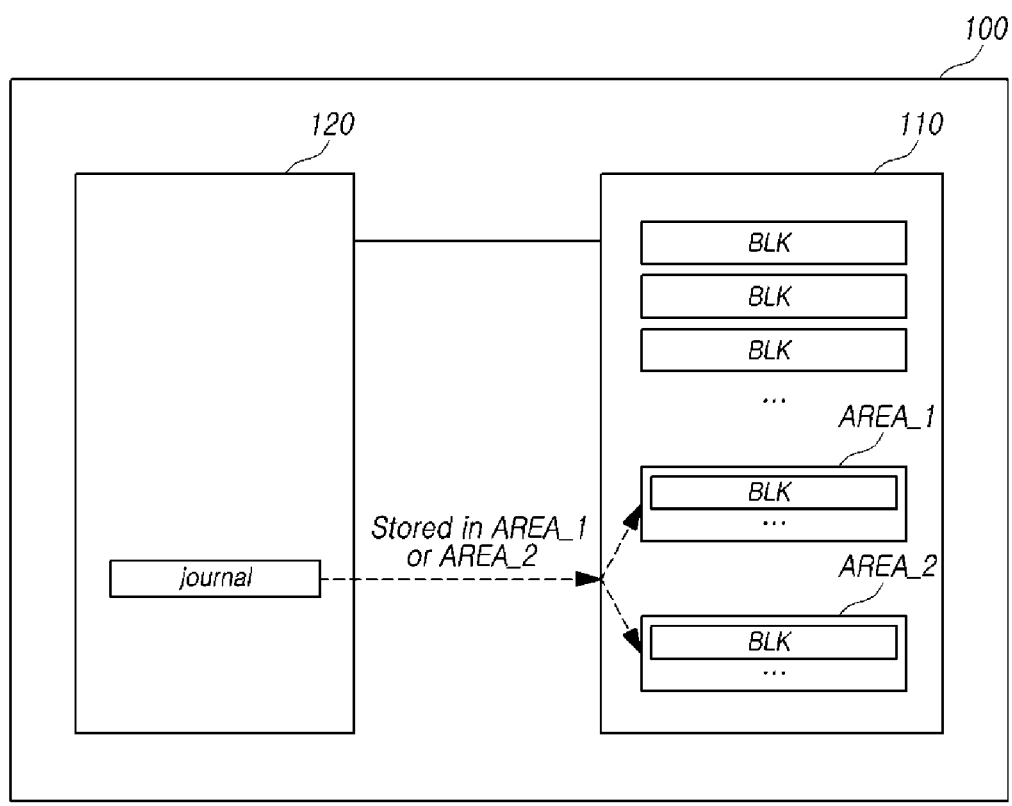
FIG. 4 is a diagram illustrating a schematic operation of the memory system according to embodiments of the present disclosure.

FIG. 4 is a diagram illustrating a schematic operation of the memory system 100 according to embodiments of the present disclosure.

Referring to FIG. 4, the memory controller 120 of the memory system 100 may store the journal in the first memory area AREA_1 or the second memory area AREA_2 according to the number of free memory blocks among the plurality of memory blocks BLK. The memory controller 120 may set two memory areas in the memory device 110 and may store the journal in one of the two memory area in order to separately manage the journals generated in the process of executing an operation (e.g., garbage collection) for securing free memory blocks due to an insufficient number of free memory blocks.

The specific embodiment of the operation in which the journal is stored in the first memory area AREA_1 or the second memory area AREA_2 according to the number of free memory blocks will be described in detail with reference to FIG. 6 below.

The journal may include mapping change information in a format of "a logical address A/a physical address B before a change/a physical address B' after the change" between the logical address and the physical address corresponding to specific data among metadata. In the case that the data corresponding to the logical address A moves from the location indicated by the physical address B of the memory device 110 to the location indicated by the physical address B', the journal may include information that the physical address mapped to the logical address A has changed from B to B'.

Each of the first memory area AREA_1 and the second memory area AREA_2 may include one or more of a plurality of memory blocks BLK included in the memory device 110.

Moreover, the manner of storing the journal may vary depending on whether the journal is stored in the first memory area AREA_1 or the second memory area AREA_2. Hereinafter, this will be described in FIG. 5.

Figure 5:
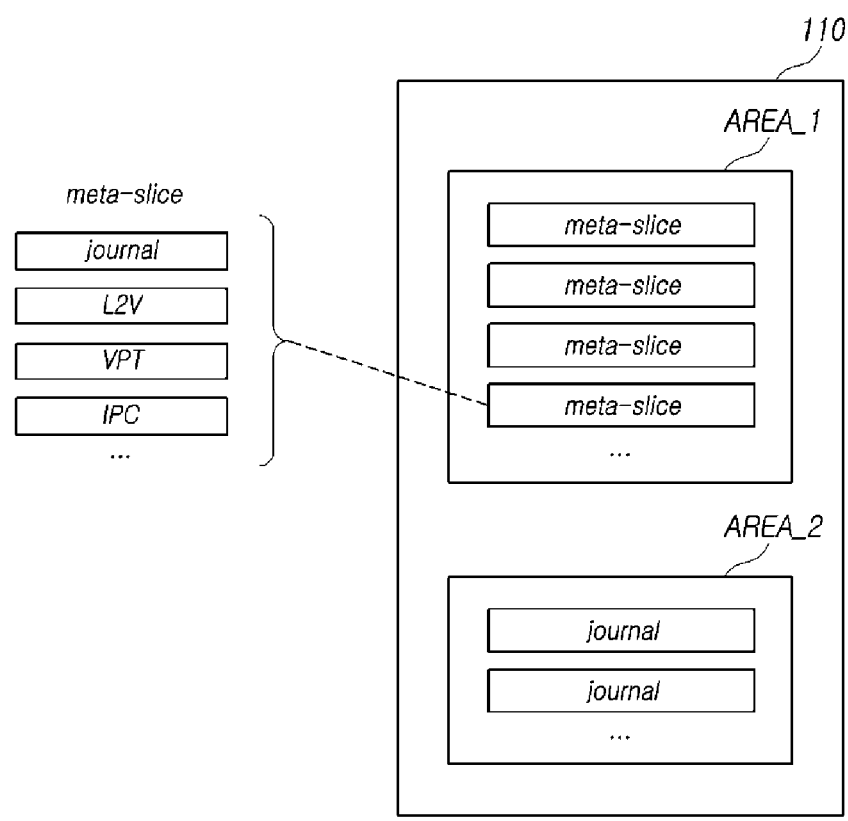
FIG. 5 is a diagram illustrating an example of storing the journal in the memory device by the memory system according to embodiments of the present disclosure.

FIG. 5 is a diagram illustrating an example of storing the journal in the memory device by the memory system 100 according to embodiments of the present disclosure.

Referring to FIG. 5, the memory controller 120 of the memory system 100 may include the journal in a meta-slice and store the meta-slice in the first memory area AREA_1 when storing the journal in the first memory area AREA_1.

The meta-slice may be a unit constituting a part of meta-data and may be used by the memory controller 120 to divide and manage meta-data. The memory controller 120 may combine the journal and other meta-data information (e.g., L2V (Logical-to-Vertical) information, VPT (Valid Page Table) information, IPC (Invalid Page Count) information) together to form the meta-slice.

The memory controller 120 may determine the size of the meta-slice and the number of meta-slices stored in the first memory area AREA_1. For example, the memory controller 120 may determine the size of the meta-slice and the number of meta-slices according to the logical address.

On the other hand, when storing the journal in the second memory area AREA_2, the memory controller 120 may independently store only the journal instead of storing the journal together with other meta-data information. In this case, since it is not necessary to perform an operation of configuring the meta-slice to store the journal, the memory controller 120 may store the journal in the second memory area AREA_2 faster than when storing the journal in the first memory area AREA_1.

Figure 6:
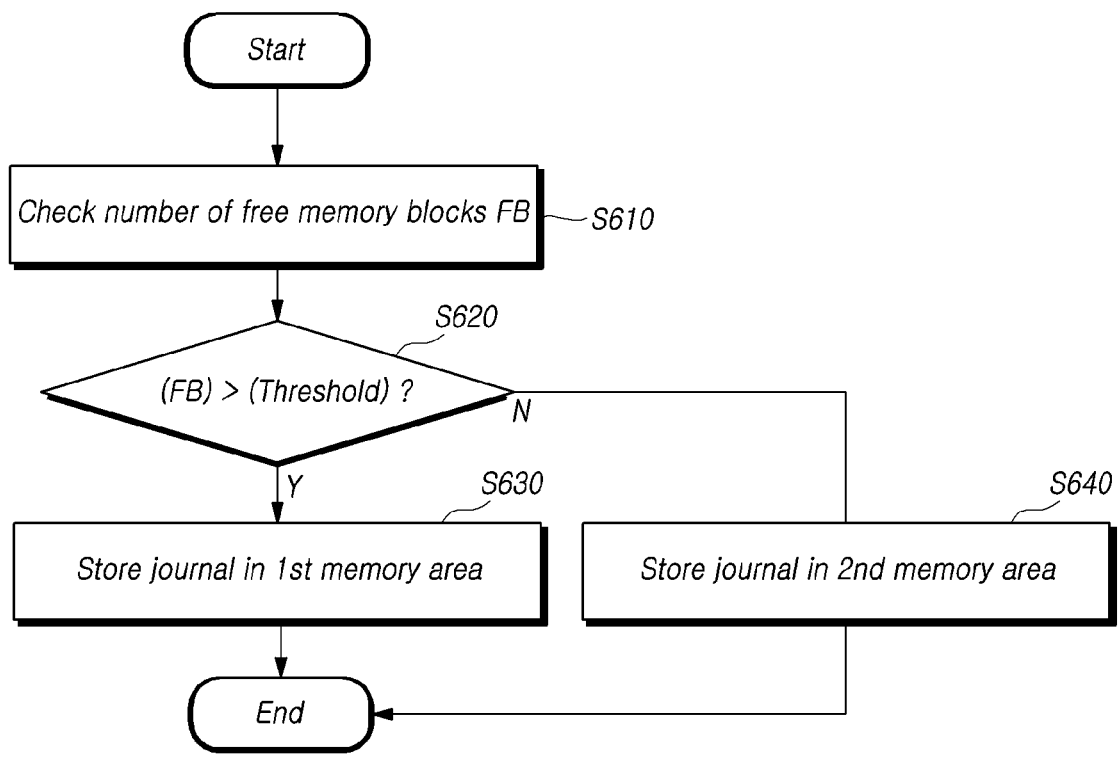
FIG. 6 is a flowchart illustrating an example of an operation of storing the journal according to the number of free memory blocks by the memory system according to embodiments of the present disclosure.

FIG. 6 is a flowchart illustrating an example of an operation of storing the journal according to the number of free memory blocks by the memory system 100 according to embodiments of the present disclosure.

Referring to FIG. 6, the memory controller 120 of the memory system 100 may check the number of free memory blocks FB among the plurality of memory blocks BLK included in the memory device 110 (S610).

In addition, the memory controller 120 may determine whether the number of the free memory blocks FB checked in operation S610 exceeds a set threshold (S620).

In the case that the number of the free memory blocks FB exceeds the threshold (S620-Y), the memory controller 120 may store the journal in the first memory area AREA_1 (S630). In this case, the journal may be included in the meta-slice together with other meta-data information and the meta-slice may be stored in the first memory area AREA_1 as described with reference to FIG. 5.

On the other hand, when the number of free memory blocks FB is less than or equal to the threshold (S620-N), the memory controller 120 may store the journal in the second memory area AREA_2 (S640). In this case, the journal may be independently stored as described in FIG. 5.

In the case that the memory controller 120 stores the journal in the second memory area AREA_2, the changes in the mapping information may be reflected only in the copy of the mapping table loaded in the working memory 125.

It will be described the reason why the memory controller 120 of the memory system 100 sets the memory area storing the journal differently according to the number of free memory blocks as follows.

The memory controller 120 may use the journal including mapping change information between logical addresses and physical addresses in order to perform an operation of updating the mapping table indicating the mapping relationship between logical addresses and physical addresses to the latest version. The operation of updating the mapping table to the latest version may be referred to as the operation of rebuilding the mapping table, and the operation of reflecting the journal to the mapping table to update the mapping table may be referred as the operation of replaying the journal.

In this case, when the operation for securing the free memory block (e.g., garbage collection) is in progress, data stored in the memory device 110 may physically move to another location. Accordingly, the change in mapping information between the logical address and the physical address may occur, and the journal including the mapping change information may be created.

When the memory controller 120 performs the power-on operation again after power-off, the journal created by the operation for securing the free memory block may be also reflected in the mapping table. In this case, the number of free memory blocks included in the memory device 110 is reduced since the journal generated by the operation for securing the free memory block is reflected in the mapping table. This is because the updated mapping table is also written to the free memory block of the memory device 110.

Therefore, in the case that the power-off occurs repeatedly while the operation for securing the free memory block is in progress, there may be a problem that the memory controller 120 cannot normally secure the free memory block since the free memory block is consumed due to the journal created by the operation to secure the free memory block.

To prevent such a problem, the memory controller 120 may store the created journal in a separate memory area when the free memory block is insufficient, that is when the number of free memory blocks is less than the threshold and may reflect the journal in the mapping table after the free memory block is sufficiently secured later. Accordingly, the memory controller 120 may prevent a problem in which the number of free memory blocks rapidly decreases when the power-off occurs repeatedly.

In the case that the number of free memory blocks is less than or equal to the threshold, the memory controller 120 may independently store only the journal in the second memory area AREA_2, so that the journal can be stored faster than when storing the journal together with other meta-data in the meta-slice. Therefore, the memory controller 120 can reduce the load required for storing the journal and can execute the operation for securing the free memory block more rapidly.

When the journal is stored in the first memory area AREA_1 or the second memory area AREA_2 according to the number of free memory blocks, the memory system 100 is required to record information on the memory area in which the journal is stored among the two memory areas.

Hereinafter, a start flag FLG_START and an end flag FLG_END used for this purpose will be described. First, the start flag FLG_START will be described in FIGS. 7 to 8, and the end flag FLG_END will be described in FIGS. 9 to 10.

Figure 7:
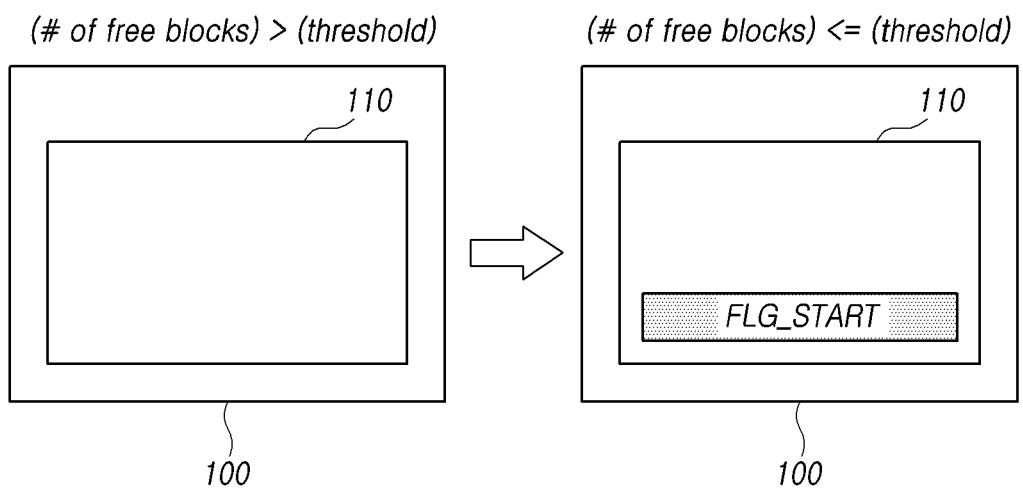
FIG. 7 is a diagram illustrating an example of an operation of storing the start flag in the memory device by the memory system according to embodiments of the present disclosure.

FIG. 7 is a diagram illustrating an example of an operation of storing the start flag FLG_START in the memory device by the memory system 100 according to embodiments of the present disclosure.

Referring to FIG. 7, the memory controller 120 of the memory system 100 may store the start flag FLG_START in the memory device 110 in response to the number of free memory blocks among the plurality of memory blocks BLK included in the memory device 110 decreasing from a value exceeding the threshold to a value less than or equal to the threshold.

The start flag FLG_START is a flag indicating that the operation of storing the journal in the second memory area AREA_2 has started. If the start flag FLG_START is stored in the memory device 110, the memory controller 120 may identify that the number of free memory blocks from among the plurality of memory blocks BLK included in the memory device 110 decreases to less than or equal to the threshold, so that the newly created journal is stored in the second memory area AREA_2.

Figure 8:
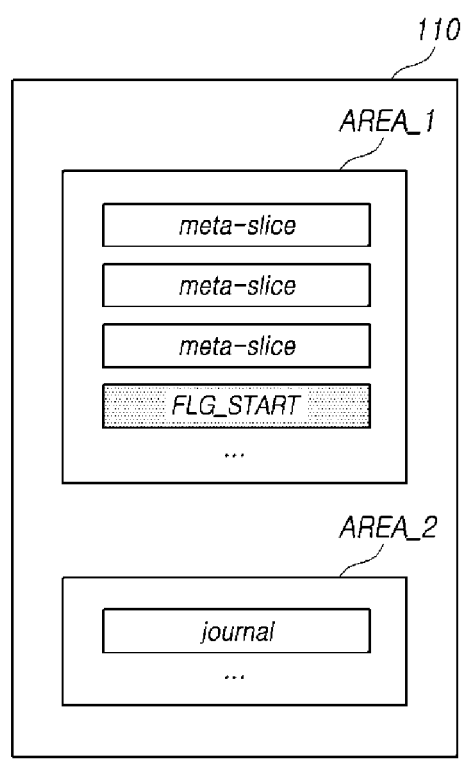
FIG. 8 is a diagram illustrating an example of a location where the start flag is stored on a memory device according to embodiments of the present disclosure.

FIG. 8 is a diagram illustrating an example of a location where the start flag FLG_START is stored on a memory device 110 according to embodiments of the present disclosure.

Referring to FIG. 8, the memory controller 120 may store the start flag FLG_START in the first memory area AREA_1 included in the memory device 110. The start flag FLG_START may be stored in the first memory area AREA_1 together with the meta-slice described in FIG. 5.

The memory controller 120 may search the first memory area AREA_1 of the memory device 110, and, when the start flag FLG_START is detected in the first memory area AREA_1, the memory controller 120 may recognize that the operation of storing the journal in the second memory area AREA_2 has started.

Figure 9:
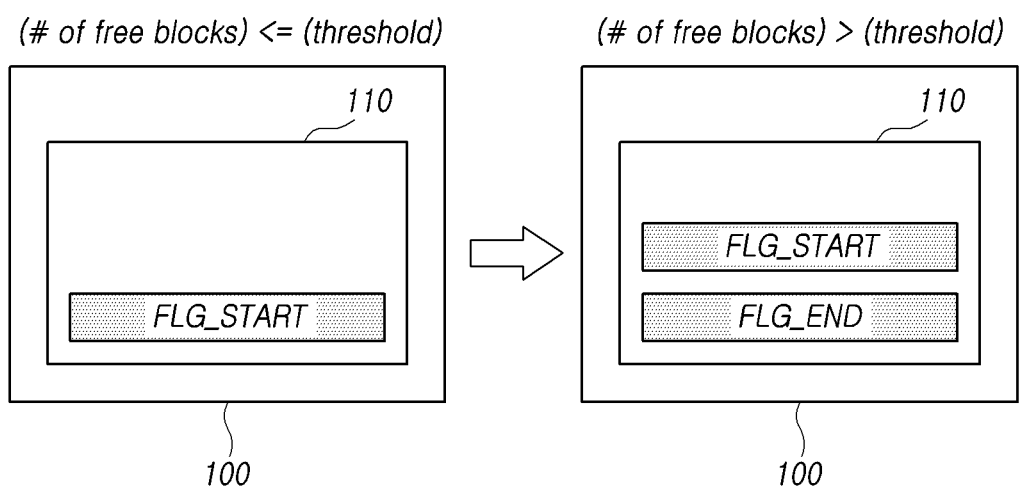
FIG. 9 is a diagram illustrating an example of an operation of storing the end flag in the memory device by the memory system according to embodiments of the present disclosure.

FIG. 9 is a diagram illustrating an example of an operation of storing the end flag FLG_END in the memory device by the memory system 100 according to embodiments of the present disclosure.

Referring to FIG. 9, the memory controller 120 of the memory system 100 may, after storing the start flag FLG_START in the first memory area AREA_1, store the end flag FLG_END in the memory device 110 in response to the number of the free memory block among the plurality of memory blocks BLK included in the memory device 110 increasing from a value equal to or less than the threshold to a value exceeding the threshold.

The end flag FLG_END is a flag indicating that the operation of storing the journal in the second memory area AREA_2 has ended. If the start flag FLG_START and the end flag FLG_END are stored together in the memory device 110, the memory controller 120 may recognize that the newly created journal is stored in the first memory area AREA_1 by returning to the state in which the number of free memory blocks among the plurality of memory blocks BLK included in the memory device 110 exceeds the threshold.

Figure 10:
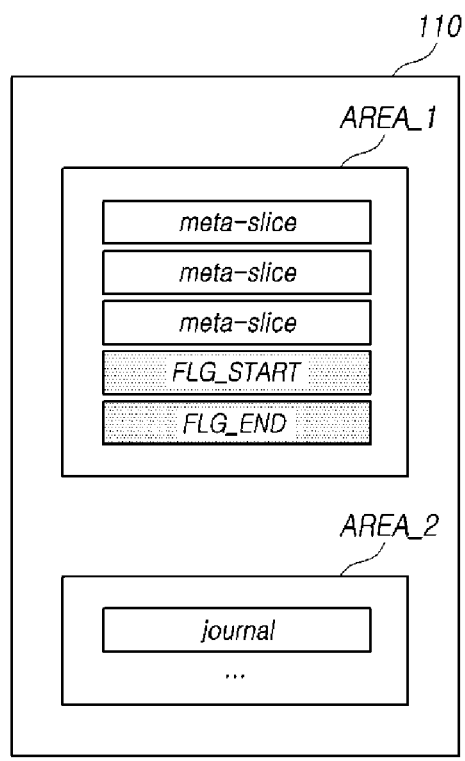
FIG. 10 is a diagram illustrating an example of a location where the end flag is stored on the memory device according to embodiments of the present disclosure.

FIG. 10 is a diagram illustrating an example of a location where the end flag FLG_END is stored on the memory device 110 according to embodiments of the present disclosure.

Referring to FIG. 10, the memory controller 120 may store the end flag FLG_END in the first memory area AREA_1 included in the memory device 110. The end flag FLG_END may be stored in the first memory area AREA_1 together with the meta-slice described in FIG. 5 and the start flag FLG_START described in FIG. 7.

The memory controller 120 may search the first memory area AREA_1 of the memory device 110, and if the start flag FLG_START and the end flag FLG_END are detected in the first memory area AREA_1, the memory controller 120 may recognize that the operation of storing the journal in the second memory area AREA_2 has ended.

Hereinafter, the operation performed by the memory system 100 upon power-on after power-off occurs, depending on whether the start flag FLG_START and the end flag FLG_END described in FIGS. 7 to 10 are stored in the memory device 110, will be described.

Figure 11:
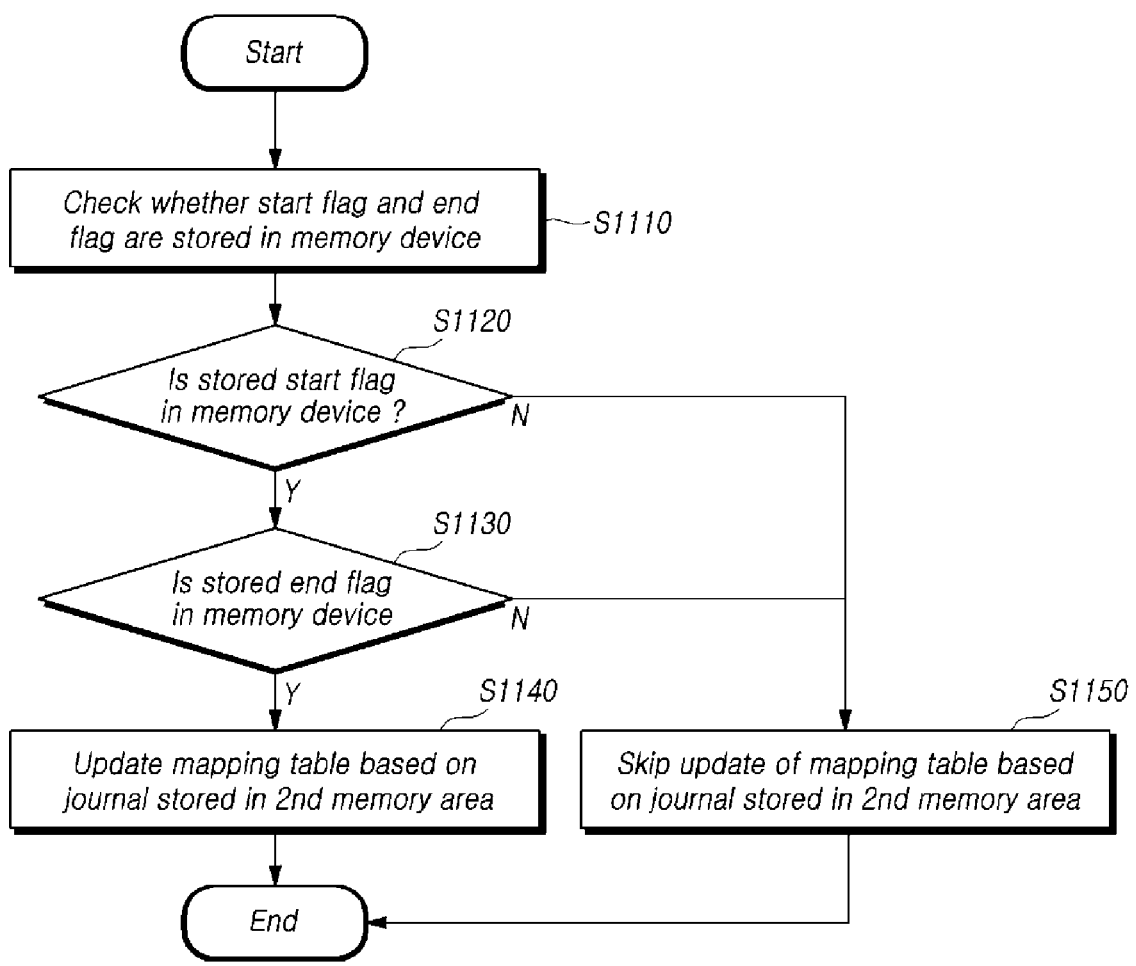
FIG. 11 is a flowchart illustrating an example of an operation performed by the memory system when power is turned on after power-off occurs according to embodiments of the present disclosure.

FIG. 11 is a flowchart illustrating an example of an operation performed by the memory system 100 when power is turned on after power-off occurs according to embodiments of the present disclosure.

Referring to FIG. 11, the memory controller 120 of the memory system 100 may check whether the start flag FLG_START and the end flag FLG_END are stored in the memory device 110 when the power is turned on after power-off occurs (S1110). In this case, the start flag FLG_START and the end flag FLG_END may be stored in the first memory area AREA_1 of memory device 110.

The memory controller 120 may first determine whether the start flag FLG_START is stored in the memory device 110 (S1120).

When the start flag FLG_START is stored in the memory device 110 (S1120-Y), the memory controller 120 determines whether the end flag FLG_END is stored in the memory device 110 (S1130).

When the end flag FLG_END is also stored in the memory device 110 (S1130-Y), the memory controller 120 may update the mapping table based on the journal stored in the second memory area AREA_2 (S1130).

The fact that the start flag FLG_START and the end flag FLG_END have been stored in the memory device 110 may mean that the operation of storing the journal in the second memory area AREA_2 is finished, and the journal used for updating the mapping table is stored in the second memory area AREA_2. In addition, since the end flag FLG_END is stored in the memory device 110, the number of free memory blocks included in the memory device 110 may be sufficient, so even if the journal stored in the second memory area AREA_2 is updated to the mapping table, the problem of insufficient free memory blocks may not occur.

In this case, after rebuilding the mapping table based on the journal stored in the second memory area AREA_2 to update the mapping table, the memory controller 120 may store a snapshot of the rebuilt mapping table in the working memory 125.

After updating the mapping table based on the journal stored in the second memory area AREA_2, the memory controller 120 may delete the start flag FLG_START and the end flag FLG_END stored from the memory device 110 and delete all journals from the second memory area AREA_2.

On the other hand, in the case that the start flag FLG_START is not stored in the memory device 110 (S1120-N), or the start flag FLG_START is stored in the memory device 110, but the end flag FLG_END is not stored in the memory device 110 (S1130-N), the memory controller 120 may skip the process of updating the mapping table based on the journal stored in the second memory area AREA_2 (S1150).

The fact that the start flag FLG_START is not stored in the memory device 110 means that the operation of storing the journal in the second memory area AREA_2 has not started. Therefore, this is because the journal to be reflected in the mapping table does not exist in the second memory area AREA_2.

Furthermore, the fact that the start flag FLG_START is stored in the memory device 110, but the end flag FLG_END is not stored in the memory device 110 means the number of free memory blocks included in the memory device 110 is still insufficient. Therefore, this is because the journal is required to be continuously stored in the second memory area AREA_2 until sufficient free memory blocks are secured.

In embodiments of the present disclosure, the memory system 100 may determine a memory area for storing the journal based on the number of free memory blocks among the plurality of memory blocks included in the memory device 110.

In this case, the memory system 100 may perform an operation of determining the memory area in which the journal is stored according to an instruction of the host.

Figure 12:
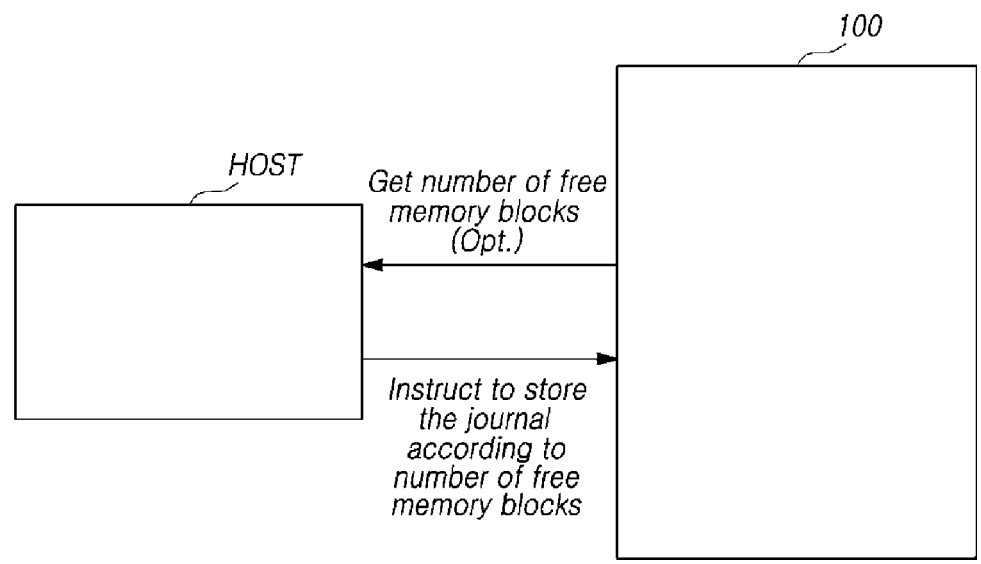
FIG. 12 is a diagram illustrating an example in which the memory system according to embodiments of the present disclosure determines the memory area for storing the journal according to the instruction of the host.

FIG. 12 is a diagram illustrating an example in which the memory system 100 according to embodiments of the present disclosure determines the memory area for storing the journal according to the instruction of the host.

Referring to FIG. 12, the memory system 100 may receive a request from the host instructing to perform an operation of storing the journal in the first memory area AREA_1 or the second memory area AREA_2 based on information on the number of free memory blocks. In this case, the host may, for example, determine whether to transmit the request to the memory system 100 according to the number of free memory blocks included in the memory device 110 of the memory system 100.

In this case, the memory system 100 may store the journal in the first memory area AREA_1 or the second memory area AREA_2 based on information on the number of free memory blocks.

The host may check the number of free memory blocks included in the memory device 110, and if the number of free memory blocks is less than or equal to the threshold, the host may transmit the request to the memory system 100 to instruct the memory system 100 to store the journal in the second memory area AREA_2. In this case, before the host transmits the request instructing to update the journal stored in the second memory area AREA_2 to the mapping table, the memory system 100 may skip the operation of updating the journal stored in the second memory area AREA_2 into the mapping table upon the power-on after the power-off.

Figure 13:
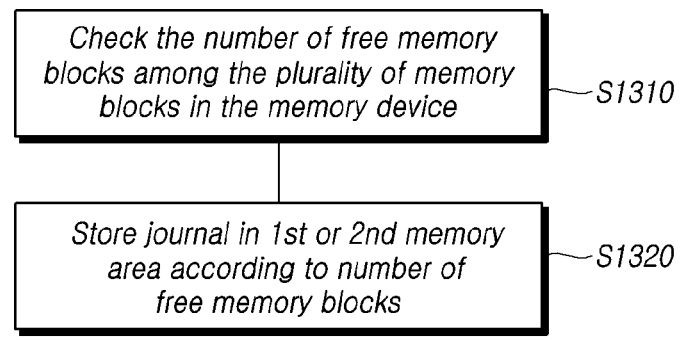
FIG. 13 is a flowchart illustrating the operating method of the memory system according to embodiments of the present disclosure.

FIG. 13 is a flowchart illustrating the operating method of the memory system 100 according to embodiments of the present disclosure.

Referring to FIG. 13, the operating method of the memory system 100 may include checking the number of free memory blocks among the plurality of memory blocks BLK in the memory device 110 (S1310).

In addition, the operating method of the memory system 100 may include storing the journal including mapping change information between the logical address and the physical address in the first memory area AREA_1 or the second memory area AREA_2 each including at least one of the plurality of memory blocks BLK according to the number of free memory blocks checked in the operation S1310 (S1320).

The journal may be included in the meta-slice constituting meta-data and the meta-slice may be stored in the first memory area AREA_1 when the journal is stored in the first memory area AREA_1, and the journal may be independently stored when stored in the second memory area AREA_2.

As an example, the journal may be stored in the first memory area AREA_1 when the number of free memory blocks exceeds the set threshold and may be stored in the second memory area AREA_2 when the number of free memory blocks is less than or equal to the threshold.

The operation S1320 may include, in response to the number of free memory blocks decreasing from a value exceeding the threshold to a value equal to or less than the threshold, storing the start flag FLG_START, which indicates that the operation of storing the journal in the second memory area AREA_2 is started, in the memory device 110. In this case, the start flag FLG_START may be stored in the first memory area AREA_1.

The operation S1320 may include, in response that the number of free memory blocks among the plurality of memory blocks increases from the value equal to or less than the threshold to the value exceeding the threshold after storing the start flag FLG_START in the memory device 110, storing the end flag FLG_END indicating the end of the operation of storing the journal in the second memory area AREA_2 in the memory device 110. In this case, the end flag FLG_END may be stored in the first memory area AREA_1.

In addition, the operating method of the memory system 100 may further include, in the case that the start flag FLG_START and the end flag FLG_END are detected as stored in the memory device 110 upon the power-on operation after the power-off occurs, updating the mapping table indicating the mapping relationship between the logical address and the physical address based on the journal stored in the second memory area AREA_2.

In some implementations, the operation of the memory controller 120 described above may be controlled by the control circuit 123 and may be performed in such a manner that the processor 124 executes (drives) firmware in which the overall operation of the memory controller 120 is programmed.

Figure 14:
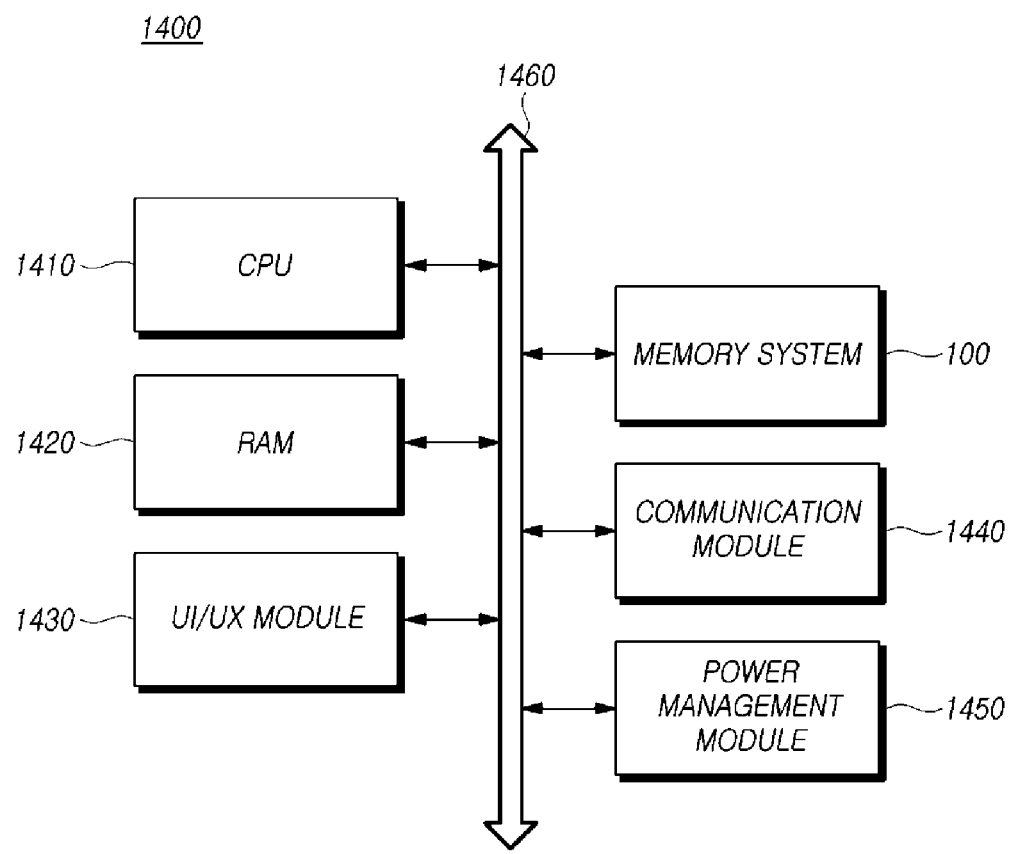
FIG. 14 is a diagram illustrating the configuration of a computing system based on some embodiments of the disclosed technology.

FIG. 14 is a diagram illustrating the configuration of a computing system 1400 based on an embodiment of the disclosed technology.

Referring to FIG. 14, the computing system 1400 based on an embodiment of the disclosed technology may include: a memory system 100 electrically connected to a system bus 1460; a CPU 1410 configured to control the overall operation of the computing system 1400; a RAM 1420 configured to store data and information related to operations of the computing system 1400; a user interface/user experience (UI/UX) module 1430 configured to provide the user with a user environment; a communication module 1440 configured to communicate with an external device as a wired and/or wireless type; and a power management module 1450 configured to manage power used by the computing system 1400.

The computing system 1400 may be a personal computer (PC) or may include a mobile terminal such as a smartphone, a tablet or various electronic devices.

The computing system 1400 may further include a battery for supplying an operating voltage, and may further include an application chipset, a graphic-related module, a camera image processor, and a DRAM. Other elements would be apparent to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made without departing from the spirit and scope of the disclosure as defined in the following claims.

What is claimed is:

1. A memory system comprising:
a memory device including a plurality of memory blocks; and
a memory controller for communicating with the memory device and controlling the memory device,
wherein the memory controller further stores, in a first memory area or a second memory area each including at least one of the plurality of memory blocks, a journal including mapping change information between a logical address and a physical address according to a number of free memory blocks among the plurality of memory blocks,
wherein the memory controller stores the journal in the first memory area when the number of free memory blocks among the plurality of memory blocks exceeds a threshold, and
wherein the memory controller stores the journal in the second memory area when the number of free memory blocks among the plurality of memory blocks is less than or equal to the threshold.

2. The memory system of claim 1,
wherein the memory controller stores the journal by including the journal in a meta-slice constituting meta-data when storing the journal in the first memory area, and
wherein the memory controller independently stores the journal when storing the journal in the second memory area.

3. The memory system of claim 1, wherein, in response to when the number of free memory blocks among the plurality of memory blocks decreases from a value exceeding the threshold to a value equal to or less than the threshold, the memory controller further stores a start flag, which indicates that the operation of storing the journal in the second memory area is started, in the memory device.

4. The memory system of claim 3, wherein the memory controller stores the start flag in the first memory area.

5. The memory system of claim 3, wherein, in response to the number of free memory blocks among the plurality of memory blocks increasing from the value equal to or less than the threshold to the value exceeding the threshold after the storing of the start flag in the memory device, the memory controller further stores an end flag, which indicates an end of the operation of storing the journal in the second memory area, in the memory device.

6. The memory system of claim 5, wherein the memory controller stores the end flag in the first memory area.

7. The memory system of claim 5, wherein, in a case when the start flag and the end flag are detected as stored in the memory device upon a power-on operation after a power-off occurs, the memory controller further updates a mapping table indicating a mapping relationship between the logical address and the physical address based on the journal stored in the second memory area.

8. The memory system of claim 1, wherein the memory controller further receives, from a host performing communication with the memory system, a request instructing the memory controller to perform the operation of storing the journal in the first memory area or the second memory area according to the number of free memory blocks among the plurality of memory blocks.

9. An operating method of a memory system including a memory device having a plurality of memory blocks comprising:
checking a number of free memory blocks among the plurality of memory blocks; and
storing a journal including mapping change information between a logical address and a physical address in a first memory area or a second memory area each including at least one of the plurality of memory blocks according to the number of free memory blocks among the plurality of memory blocks,
wherein the storing includes:
storing the journal in the first memory area when the number of free memory blocks among the plurality of memory blocks exceeds a threshold, and
storing the journal in the second memory area when the number of free memory blocks among the plurality of memory blocks is less than or equal to the threshold.

10. The operating method of claim 9, wherein the storing includes:
storing the journal by including the journal in a meta-slice constituting meta-data when storing the journal in the first memory area, and
storing independently the journal when storing the journal in the second memory area.

11. The operating method of claim 9, wherein the storing of the journal in the first memory area or the second memory area further includes storing, in response to the number of free memory blocks among the plurality of memory blocks decreasing from a value exceeding the threshold to a value equal to or less than the threshold, a start flag, which indicates that the operation of storing the journal in the second memory area is started, in the memory device.

12. The operating method of claim 11, wherein the storing of the journal in the first memory area or the second memory area further includes storing, in response to the number of free memory blocks among the plurality of memory blocks increasing from the value equal to or less than the threshold to the value exceeding the threshold after storing the start flag in the memory device, an end flag, which indicates an end of the operation of storing the journal in the second memory area in the memory device.

13. The operating method of claim 12, further comprising updating, in a case when the start flag and the end flag are detected as stored in the memory device upon a power-on operation after a power-off occurs, a mapping table indicating a mapping relationship between the logical address and the physical address based on the journal stored in the second memory area.

14. A memory system comprising:
a memory device including at least first and second memory regions; and
a controller suitable for:
generating a journal representing a change history of a relationship between logical and physical addresses;
controlling the memory device to store, into the first memory region, the journal together with meta-information when an available space of the memory device is greater than a threshold;
controlling the memory device to store, into the second memory region, the journal without the meta-information and to store, into the first memory region, an indication while the available space is less than the threshold; and
rebuilding, when detecting the indication right after a power interruption, meta-data stored in the memory device by replaying the journal stored in the second memory region.

15. The memory system of claim 14,
wherein the indication includes at least one of first and second indication, wherein the first indication represents a start of storing the journal into the second memory region and the second indication represents an end of the storing, and wherein the controller rebuilds the meta-data when detecting both the first and second indication.

\* \* \* \* \*